United States Patent [19]

Napadow

[11] Patent Number: 4,484,513
[45] Date of Patent: Nov. 27, 1984

[54] SPRAY BOOTH AND METHOD OF OPERATING SAME

[75] Inventor: Stanley C. Napadow, Elgin, Ill.

[73] Assignee: Protectaire Systems Co., Elgin, Ill.

[21] Appl. No.: 486,700

[22] Filed: Apr. 20, 1983

Related U.S. Application Data

[63] Continuation-in-part of Ser. No. 232,124, Feb. 9, 1981, abandoned, which is a continuation-in-part of Ser. No. 129,484, Mar. 11, 1980, abandoned.

[51] Int. Cl.³ .............................................. B05C 15/00
[52] U.S. Cl. ........................... 98/115 SB; 55/DIG. 46
[58] Field of Search .................. 55/240, 241, DIG. 46; 98/115 R, 115 SB; 261/112

[56] References Cited

U.S. PATENT DOCUMENTS

| | | | |
|---|---|---|---|
| 2,257,516 | 9/1941 | Roche, Jr. et al. | 98/115 SB |
| 2,259,626 | 10/1941 | Erikson | 98/115 SB |
| 2,694,466 | 11/1954 | Bingman | 98/115 SB X |
| 3,932,151 | 1/1976 | Lau | 55/241 X |
| 4,139,584 | 2/1979 | Holmberg | 261/112 |

FOREIGN PATENT DOCUMENTS 626191  1/1927  France ............................. 55/241

*Primary Examiner*—Harold Joyce
*Attorney, Agent, or Firm*—Fitch, Even, Tabin & Flannery

[57] ABSTRACT

A spray booth is provided with an air cleaning system to remove airborne particles for use in heavy production applications where large amounts of paint are sprayed and in which large quantities of airborne particles are collected without a substantial reduction in air flow through the booth as would fall below desired minimum standard of air flow through the booth. Air flows through an open front face of the spray booth and across the piece being sprayed to a first water cascade means which has vertical water covered surfaces offset in the fore and aft direction to trap paint particles and which define vertical extending slots through which the air may pass. The air is deflected downwardly from the first water means across the top surface of a water reservoir at the bottom of a spray booth at which surface further paint particles are trapped. The air then directed upwardly through a downwardly directed water spray wash which traps more airborne paint particles. The water particles are removed from the air prior to its discharge from the spray booth.

7 Claims, 5 Drawing Figures

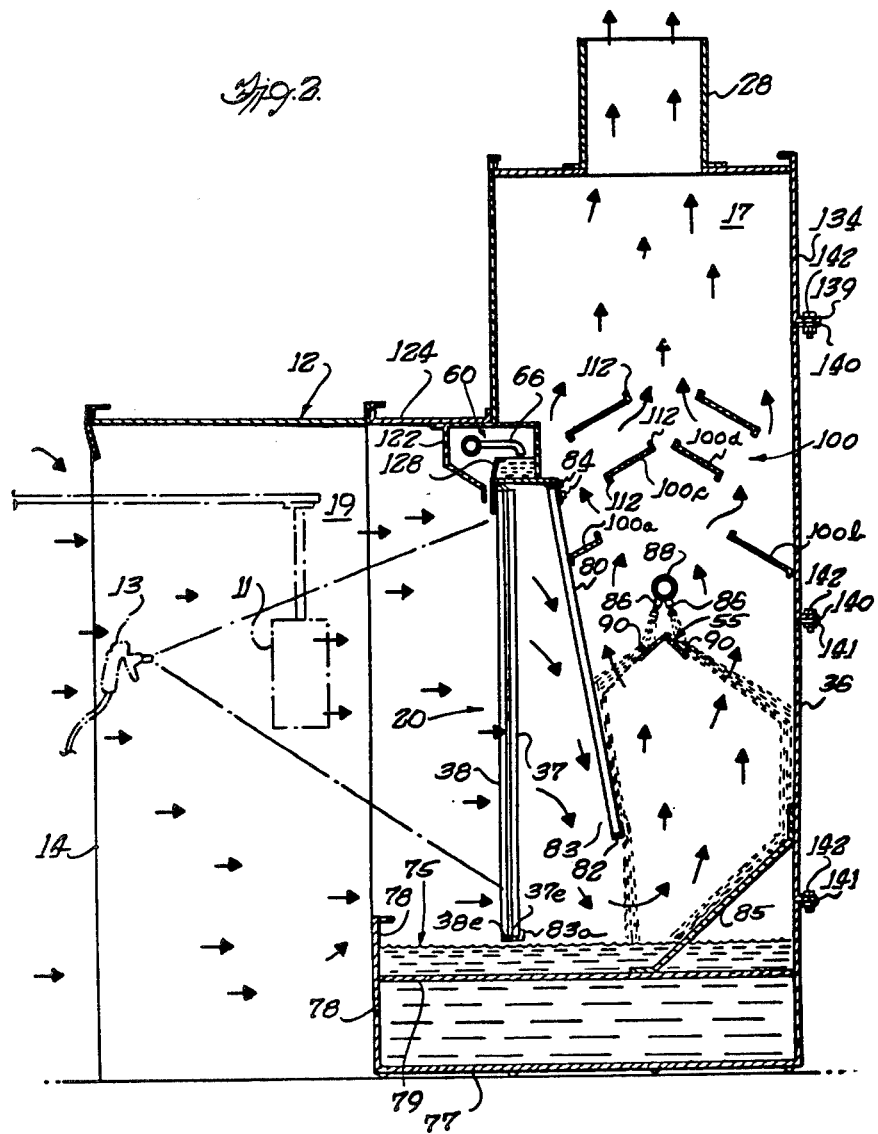

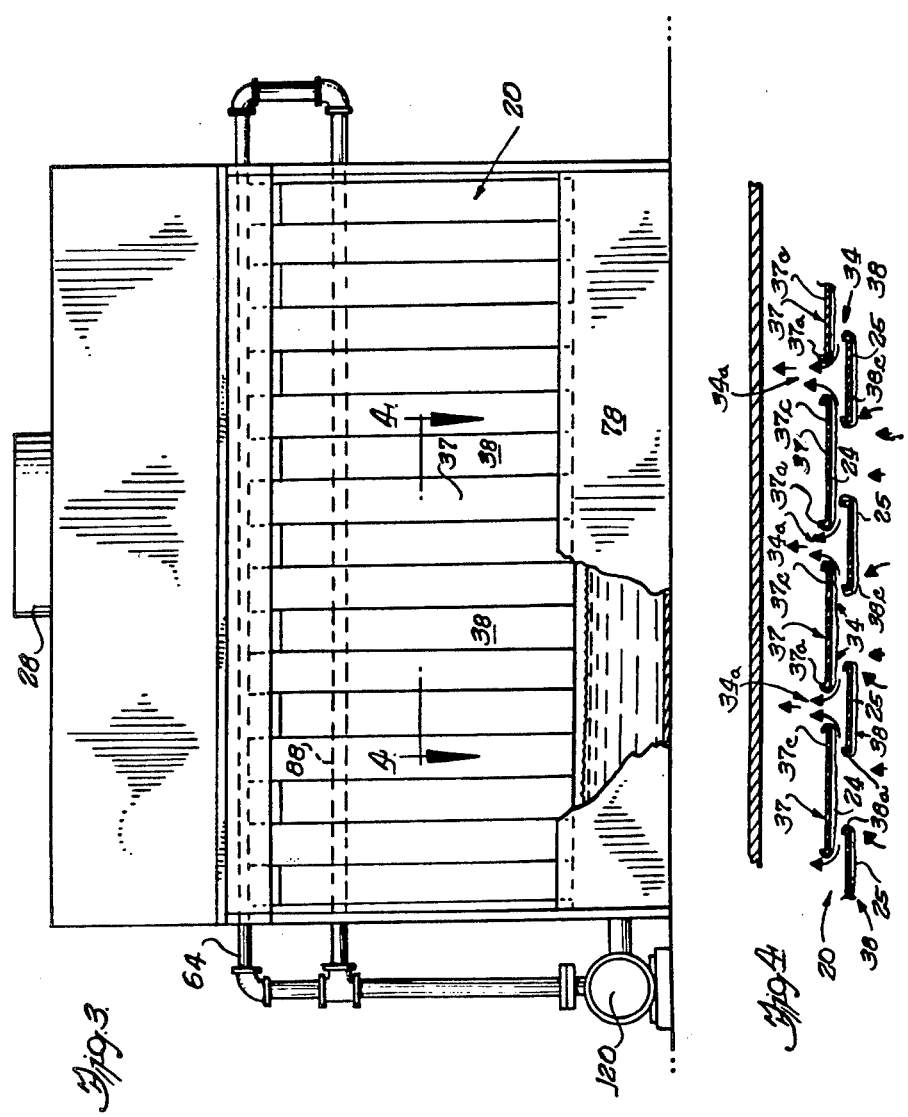

SPRAY BOOTH AND METHOD OF OPERATING SAME

This is a continuation-in-part of application Ser. No. 232,124 filed Feb. 9, 1981 abandoned which, in turn, is a continuation-in-part of application Ser. No. 129,484 filed Mar. 11, 1980 abandoned.

This invention relates a spray booth and more particularly to a spray booth using two separate water washes to remove particulates from the air flowing through such booths.

With present clean air standards and the increasing use of automated equipment for spraying and in particular paint spraying, there is a need for a spray booth which can meet the exacting standards and function over relatively long periods of time with reduced maintenance and cost of operation.

Also, present safety and health standards protect the worker, if the spraying is being done manually, by requiring that there be a minimum of 100 cfm flowing past the operator as he works. This air flow is to be uniform and is measured at various locations across the front of the booth to assure compliance with such standards. Spray booths, such as disclosed in Roche, Jr., et al. U.S. Pat. No. 2,257,516, which have an air inlet at the top of the booth and air deflectors to cause a curved sweeping flow of air and which have a slotted door will not provide the uniform and horizontal air flow of 100 cfm. That is, the air flow is not even or uniform at various locations across the width of the booth. The small fan exhaust chamber C also has a substantially smaller width than the booth face as shown in FIG. 3 of this patent and hence the air will be drawn through central portion of the booth at a rate greater than air will be drawn through either of the sides of the booth located laterally of this central portion.

Fibrous dry filters, such as shown in Roche U.S. Pat. No. 2,257,516, become clogged with paint spray particles and reduce the air flow therethrough and will decrease substantially the air flow across the face of the booth and past the operator to levels below the standard of 100 cfm. To attempt to avoid such reductions in air flow, the dry fibrous filters are recommended to be changed at short intervals of several hours in heavy spraying operations. Valuable operating time is lost when the booth is shut-down for these filter changes, particularly if the spraying operation is one using a large amount of paint per hour. The cost of the dry filters is also a factor against their useage.

There is in usage a paint spray booth that uses oil as the liquid for trapping paint particulates. Such an oil booth is disclosed in Lau U.S. Pat. No. 3,932,151. The paint spray booths of the type shown in Lau U.S. Pat. No. 3,932,151 are being replaced because of the high cost of oil and of dry filters and because the booth is dirty in that airborne oil particles become deposited around the booth on floors and equipment and on roofs of the buildings housing these booths. As explained above, the dry filters in Lau U.S. Pat. No. 3,932,151 become clogged with oil and paint particles causing a substantial reduction in air flow through the filters so that if the filters are not changed the air flow rate may fall below government standards. Further, oil is expensive and provides a cleanup problem. Various oils are used to trap different types of paint particles so that there is a problem of changing the oil bath when switching between different types of paint which is not present with spray booths using water washes. Oil, and oil changes are expensive. The fiber filters, such as disclosed in U.S. Pat. No. 3,932,151, should not be used in high production applications where large amounts of paint are sprayed because the paint particles will readily clog the filters. Moreover, such booths will not meet the conventionally desired industrial standard of 3 grains per thousand cubic feet of air flow per minute where high volumes of paint are being sprayed.

The present invention is able to meet the present EPA and OSHA standards without the use of expensive dry filters and the need to change the same by a combination of first and second water washes constructed to trap particles while still allowing the same high and uniform air flow therethrough. More specifically, most of the paint particles are trapped by a first water wash which uses staggered baffles having water flowing down the front surfaces thereof to wet paint particles and carry the same down to an underlying water reservoir. The baffles are separated fore and aft and arranged to cause the air to deflect and turn as the air flows through the baffles. The slots are formed to allow uniform air flow through the slots so as not to interfer with the uniformity of air flow across the work area and the spray operator be it a human or mechanical operator. Uniform and horizontal air flow also makes for better and more uniform paint coverage than will a highly directed air flow to sweep down and under the workpiece as disclosed in Roche, Jr., U.S. Pat. No. 2,257,516.

In accordance with the present invention, the air flowing through the first water wash having the baffles then passes into a space having an air deflector behind the baffles that provides an increasing large cross sectional area and space behind the baffles so that the air flow may be kept more uniform in the downward direction of flow toward the water reservoir where some particles will hit the reservoir surface. The space is enlarged in the downward direction so that the air flowing downwardly will not impede and reduce the air flow horizontally through the lower portions of the baffles. Thus, the system is designed to continue a high and uniform air flow in the area behind the baffles and down to the reservoir water.

Further in accordance with the invention, a second water wash is provided to reduce the total emissions to that to meet the government standards. The preferred second water wash is a spray type that allows air flow therethrough and will not become clogged as do the dry filters. In oil booths such as shown in Lau U.S. Pat. No. 3,932,151 the worker is exposed to highly ladened oil atmosphere and to an oil laden environment when changing Lau's fiber filters.

The present invention has demonstrated a ninety-eight percent particulate removal efficiency with the two water washes and meets current EPA standards and also provides a uniform and horizontal air flow of at least 100 cfm across the work area and booth face to meet current OSHA standards. These standards are met while providing a booth with low maintenance or operating costs as compared to booths using dry filters such as in Lau U.S. Pat. No. 3,932,151 or Roche, Jr. U.S. Pat. No. 2,257,516 or oil as in the Lau patent.

A general object of the invention is to provide a new and improved, as contrasted with the prior art, spray booth.

These and other objects and advantages of the invention will become apparent from the following detailed description taken in conjunction with the accompanying drawings in which:

FIG. 2 is a cross-sectional view of the booth shown in FIG. 1;

FIG. 3 is a front elevation view of the booth shown in FIG. 1;

FIG. 4 is a fragmentary and expanded cross-sectional view of the water sheet panels as taken generally along line 4—4 of FIG. 3;

Figure 1:
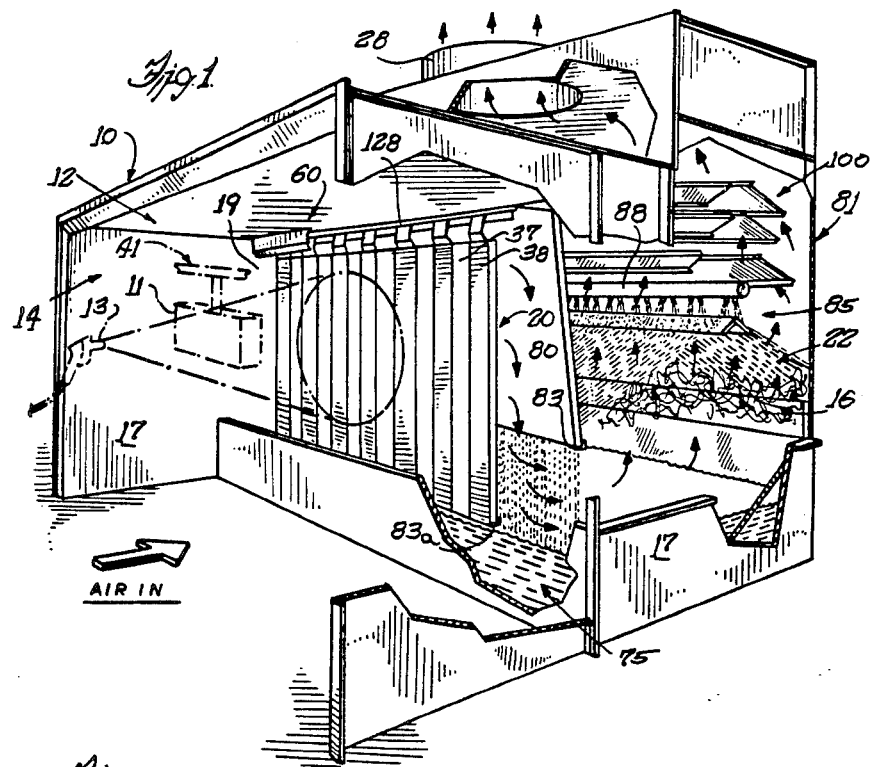
FIG. 1 is a perspective view, partially cut away, of a spray booth for practicing the method and embodying the novel features of the present invention.

As shown in the drawings for purposes of illustrations, the invention is embodied in a spray booth 10 in which is article 11 for being sprayed from a spray device 13 in a front section 12. Often a conveyor means 41 carries the work past the spray device which may be an automatic spray device 13 or may be a manually operated spray device. The present invention will be described in connection with a paint spray device 13 although the spray booth 10 may be used for other purposes than paint spraying. Whether the spray is electrostatic or a pressurized air stream of paint particles, some of the solid airborne spray particles will not adhere to the article and will pass from the work area to a first water wash means 20 at which airborne particles are removed from the air and then through a second water wash means 22 in a rear section 16 before being discharged from the booth out an exhaust chimney or duct 28 which is connected to a blower or fan (not shown) to pull the air through the booth. In a typical electrostatic paint spray booth, there is usually a predetermined minimum air velocity of at least 50 feet per minute at a front face or portal 14 for the spray booth. The required velocity, which is often 75 to 100 fpm, assures that the airborne paint particles do not flow in a reverse direction through the front face 14 but are carried through the water wash means.

Usually, in conventional spray booths, a nozzle means at top and rear of the spray booth provides a downward spray of water through which the airborne paint particles pass generally at the lower and rearward portion of the spray booth before turning to flow upward through a secondary spray before exiting through the exhaust duct. One particular problem with such booths is the lack of uniform air velocity with a very noticeable decrease in air velocity in an upper rearward portion 19, shown in FIG. 2, at which the air velocity may be only 10 to 15 fpm. This is in contrast to a preferred 100 fpm at the lower rearward portions of the work area in these conventional booths. One result of such non-uniform area flow at upper rear portions of the booth is to cause a difficulty in painting the tops of some articles with sufficient paint or with a coat of paint uniformly thick over the entire article. Of course, such spray booths may be operating at high production rates and the failure to adequately paint even a small percentage of the articles is a major problem because of the high cost of reworking and for repainting the articles on a piece work basis. Some paint spray people use the dry filters at the rear of the booth in a large flat face with air being pulled through a large vertical face formed of banks of fibrous filters. While a more uniform air flow velocity across the top of the article 11 is achieved with such dry filters in a spray booth, the dry filters quickly become clogged in high paint usage booths and often have to be cleaned at daily intervals or less. The high cost of the filters and the maintenance labor costs attendant in replacing the filters as well as down time for filter changing results in a system that is costly.

Spray booths having first and second spray washes, as above-described, are having a more difficult time meeting government standards on the amount of paint particles that can be discharged from the paint spray booth. Too large a number of particles pass through the water spray without being hit and trapped by a water droplet. Further, the above-described lack of uniform air flow, as in a dry filter spray booth, also is a serious problem for these spray booths.

In accordance with the present invention, there is provided an improved method of cleaning airborne particles from the air to meet these more stringent government standards and to provide a more uniform air velocity across the article 11. This is achieved by the method comprising the steps of: creating a substantial horizontal air flow of substantially uniform velocity across the front face 14 of the booth, cascading water at the first water wash means 20 in staggered sheets 24 and 25 overlapping each other in a lateral direction and flowing downwardly along surfaces 33 (FIG. 4), impinging airborne particles against the staggered sheets for being trapped thereby and redirecting the air flow at said sheets laterally through slots 34 defined between adjacent overlapped edges of the surfaces 33 and from the work area, and drawing the air from the first water wash means 20 and flowing the air through the second water wash means 22 to remove additional airborne particles from the air. The slots 34 extend the entire height of the rear of the work area to allow air to flow through the upper rear end 19 of the work area and front section unlike other spray booths, thereby preventing an air dead space as in prior booths. Also, the overlapping water sheets 24 and 25 appear to provide a substantially interdicting wall of water to the rearwardly traveling air and airborne particles. As clearly shown in FIG. 2, water cascading down the lower rear side of panel 80 and dropping from lower end 82 of the panel provides a third water wash in this preferred embodiment of the invention.

In the preferred embodiment of the invention, the water sheets 24 and 25 of water are very thin films of water which cover the entire vertical surfaces 33 of a plurality of vertically extending panels 37 and 38 which have their edges 37a and 38a overlapped in a vertical and lateral direction to define the slots 34. Preferably, a tortuous path to create air turbulence and contact between the airborne particles is achieved by use of channel shaped panels 37 and 38, each having their central webs 37c and 38c facing each other and overlap to prevent straight rearward flow of air causing the air to flow laterally therebetween, as best seen in FIG. 4. Most of the water comprising the water sheets 24 and 25 is on the front facing sides or surfaces 36 of these central webs 37c and 38c but the water also covers the flanges, as will be explained in detail hereinafter.

To facilitate understanding of the present invention, the invention will now be described in greater detail.

The open front face 14 at the front of the booth 10 allows the user to direct the paint spray gun 13 at the article 11 within the booth. The portal 14 must be sufficiently wide so that an article of manufacture may be spray painted from various angles so as to fully coat the article. Accordingly, the portal 14 is broad and may substantially comprise the entire front face of the first section 12 of the booth 10. Objects to be painted are suspended in front of the user as, for example on hooks 40 on an overhead conveyor 41 which passes through sidewalls 17 of the booth. Alternatively the article may be manually handled and support on a table in front of the user. Electrical conducting means may also be provided to permit electrostatic spraying of the article. The first water wash means 20 comprises the primary cleaning means and covers an apparent back surface of the painting or work area for the front section 12 of the booth 10.

To provide a tortuous and turbulent flow path of air through the first water wash means, as best seen in FIG. 4, each of the panels 37 and 38 has a pair of vertical peripheral flanges 37a and 38a projecting orthogonal to an integral central web 37c or 38c. The flanges 37a and 38a of the both sets of cascade panels 37 and 38 are directed towards the back of the booth 10. It has been found that when the flanges 37a are directed in the opposite direction from that shown herein, that is, the flanges 37a face forwardly, and when the flanges 37a and 38a are positioned sufficiently close together that a plane extending laterally and located midway between the webs 37c and 38c would intersect all of the flanges 37a and 38a, that paint began to collect on the facing edges of the flanges and bridge the flanges. Such bridging paint reduced substantially the air flow through the water curtain. Such a paint bridging has been eliminated with the flanges 37a and 38a both facing rearwardly as illustrated herein.

The larger spray paint particles from the pressurized spray gun will either hit the first set of cascade panels 38 or pass therebetween to hit the second set of cascade panels 37. Upon contacting the sheets of water on the panels, the paint droplets will be carried by the water to the bottom of the booth 10. This arrangement of the water sheets insures sufficient air-water contact to remove most of the air-dispersed particles. A sizeable percentage of the paint laden air will contact the sheets of water on the webs 37c and 38c.

Some of the air flows laterally across the water or front face 38c of the panels 38 while the remaining air flows between the front panels edges 38a toward the rear panel face 37c. The air then must flow laterally through the gaps 34 to exit at slots 34a between facing flanges 37a of the rear panels 37. This sweeping across the wet panel surfaces, and changes in direction of air flow, results in air turbulence. The turbulence causes increased air-water contact. The water covers the entire outward surfaces of the faces 37c and 38c and flanges 37a and 38a to wash away paint particles.

The panels 37 and 38 are generally vertically disposed but may be slightly inclined forwardly with the tops of the panels 37 and 38 disposed rearwardly of the booth 10, as best seen in FIG. 2.

Figure 5:
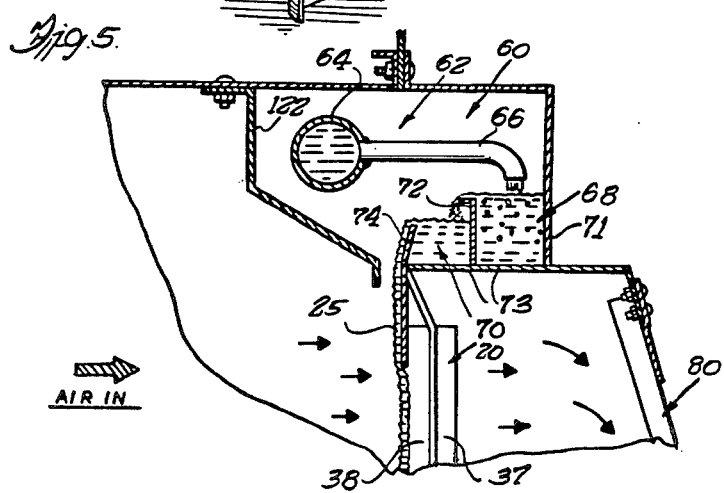
FIG. 5 is an enlarged fragmentary cross-sectional view of an upper reservoir from which the water flows to the view sheet.

In accordance with an important aspect of the invention, water is made to flow in thin sheets on the panels without large areas of discontinuities from a reservoir means 60. The latter includes, (FIG. 5) an inlet manifold 62 comprised of a pipe 64 extending across the booth 10 with a plurality of nozzles 66 extending horizontally therefrom. A manifold fourteen feet long may have eight nozzles 66. Preferably, the upper reservoir means 60 consists of a first upper reservoir 68 to which water is supplied by the manifold 62, and a second upper reservoir 70 from which water flows to the panels 44. Because the manifold 62 is supplied by water with appreciable pressure, undesirable eddy currents are generated around the nozzles 66 of the manifold 62. The two-part upper reservoir means 60 substantially eliminates the effects of the eddy current. Water overflows the upper laterally extending edge of weir 72 (FIG. 5), which forms a water holding reservoir with walls 71 and 73, of the first upper reservoir 68 into the second upper reservoir 70 over a first weir or dam means 72 which extends generally the width of the booth. The turbulent effects of the inlet current are lessened by having the waterfall current flowing in an opposite direction than the current from the nozzles 66. Furthermore, the flow of water is widely distributed over the width of the first dam means 72 thus dispersing water turbulence. Turbulence generated by the waterfall is very slight as the water falls only a matter of inches into the second upper reservoir 70. The second reservoir is defined by the bottom wall 73, the dam means 72 and a second dam means 74. The water in the second upper reservoir 70 overflows a second weir or dam means 74 to provide a continual thin sheet flow along the panels 37 and 38. The effect of the eddy currents created by the nozzles 66 of the inlet manifold 62 are essentially eliminated when the water reaches the panels and water is caused to flow in generally flat uniform sheets down the front faces of the panels.

A lower water reservoir 75 receives the water from the panels 37 and 38 and is bounded by the sidewalls 17 of the booth 10 on the sides and in front by a short vertical panel base 78. A bottom wall 79 for the reservoir as illustrated may be elevated a short distance from a floor wall 77. The reservoir 75 covers substantially the entire rear and bottom portion of the booth and extends to a back wall 77 for the booth. Water is recirculated from the reservoir 75 to the first and second water wash means 20 and 22.

An air deflector means 80 is provided behind the first water wash means 20 to direct the air which has passed through its sheets of water toward the bottom of the booth 10. The deflector means 80 is generally flat sheet which slants towards the back of the booth 10 from the top toward the bottom to provide a greater air space behind the flood sheet 24 at the bottom of the booth 10. More specifically, the deflector means 80 includes a panel means inclined downwardly and rearwardly from its upper end to its lower end. This defines a larger increasing cross sectional area, as viewed in FIG. 2, behind the baffles in the downward direction. The increasing cross sectional area behind the water wash baffles 37 and 38 accommodates the increasing amount of air in the downward direction between the baffles 37 and 38 and panel 80 and does not block a uniform flow of air across the lower ends of the baffles 37 and 38 as would be the case if the air deflector means 80 was vertical and provided a uniform cross-sectional space behind the baffles. For instance, and by way of example, if 500 cfm of air flow across the upper one foot of the panels 37 and 38, and a second 500 cfm of air flows across the next lower one foot of the panels 37 and 38, the space behind the second foot must be larger to accommodate the now 1000 cfm appearing in such space. The deflector means 80 is inclined to provide such additional space so that the air from above and flowing down in this space between the baffles 37 and 38 and the deflector means 80 does not substantially impede the air across the lower portions of the baffles 37, 38. Thus, substantial, uniform air flow is maintained across the baffles 37 and 38 and through the space behind the baffles. The downwardly directed air passes over and contacts the water which accumulates in the lower reservoir 75 at the bottom of the booth 10. The air flowing down between baffles and the panel 80 turns and flows through a third water wash, as shown in FIG. 2, in which water falls from the lower edge 82 of the inclined panel. Furthermore, some air cleaning may take place at the surface of the lower reservoir 75, if paint particles contact the surface of the water. The deflector means 80 is easily removable from the booth. Its lower end 82 merely rests in an angle 83 extending between sidewalls 17 and its upper edge is fastened by fasteners 84 to the booth wall 73.

Herein, the lower ends 37e and 38e of the panels 37 and 38 are spaced slightly above the surface of the water in the lower reservoir to avoid accumulation of paint thereon due to floating paint particles on the water surface hitting the panels. In operation, the water falling from the panels and the air cause the water to splash about the panel ends so that the air passing beneath the lower ends is also washed. The air passing under the panels has the longest upward path of travel through the secondary wash so that it will be cleaned.

The air which has passed through the upper part of the first water wash flows down below the deflector 80 and is pulled upward through the secondary washing means 22 to remove paint particles which have eluded the primary cleaning means 20. To aid in directing the air upward a flat panel reflector 85 extends below from the back wall 81 and the lower reservoir floor 79 at about a 45° angle.

The secondary cleaning means 22 uses a high velocity downward spray or sheet of water, in which upwardly directed air is cleaned as paint particles are caught by the downwardly directed spray 30. The spray 30 is developed by jets or streams of water splashing over a splash plate 85. The streams of water are provided by a plurality Vee jet of nozzles 86 which are arranged in pairs each located at 15° to the true vertical and are carried by a spray manifold 88 which extends across the width of the booth 10. The manifold 88 may be 3 to 4-inch pipe and the nozzles 86 are located about every 3 inches along the manifold 88. The splash plate 85 is comprised of two plates 90 which angle downward from a common peak located directly under and several inches from the nozzles 86. The nozzle-splash plate combination is preferred for use in paint spraying booth 10 as the splash plate 85 shields the nozzles 86 from the paint laden air to prevent the spray nozzles 86 from becoming clogged with paint. Herein, the water is pumped with a pressure pump having a 70-foot head and with a large volume of water issuing from the nozzles, for example, 40 gallons per linear foot of manifold pipe. Thus, for a ten-foot long booth approximately 400 gallons per minute are sprayed and at a high velocity. The spray from the splash plate expands from about 3 to 5-inches to several feet in width between the deflector plate and the rear wall of the booth.

Increased contact between airborne particles and the spray 30 is achieved by slowing down the air as it flows upwardly through the spray 30. More specifically, the cross-sectional area of the passageway increases in an upward direction to slow down the air velocity to give the high velocity downward traveling water particles a chance to hit and trap paint particles.

A plurality of baffles 100 interdict the upward flow of air to cause water particles from the spray to be removed from the air prior to exhaust through the duct 28. The baffles 100 are generally flat sheets extending from one side wall 17 to the other side wall 17 of the booth 10. The baffles slant upwardly toward the exhaust duct 28 which is centrally located at the top of rear section 16 of the booth 10.

Longitudinal flanges 112 depend generally perpendicularly from each edge of the baffles 100. The flanges 112 provide added rigidity to the long baffles which may be supported only at their ends by the booth side walls 17. The flanges 112 at each upper baffle edge depend upwardly so as not to interfere with air flow and the flanges 112 at each lower baffle depend downwardly so that water does not collect on the upper surfaces of the baffles 100.

A first pair of baffles 100 are located near the front and rear of second section, one baffle 100a being positioned adjacent to the deflector 80 and the other 100b being adjacent to the back panel. The first pair of baffles 100 directs the air flow inwardly, the air flow having diverged around the spraying manifold 88. A second pair of baffles 100c and 100d is located toward the middle of the rear section. Additional baffles may optionally be provided to increase air-baffle contact. The cross-sectional area of the passageway above the baffles 100 is larger than cross-sectional area of the baffle zone to reduce the air velocity and thereby the ability of the air to carry off water and/or paint particles. Substantially clean air is exhausted through the exhaust chimney 28 which is connected to the air flow generating means (not shown) which draws the air through the booth 10. In the preferred booth, the walls 17 are spaced apart a distance substantially equal from the front to the rear of the booth. The baffles 100 also extend across the entire width of the rear of the booth between walls 17. Therefore, the baffles 100 will not create a pressure differential along the end ones of the baffles 37 and 38 as would occur if the width between the walls 17 was substantially less at the upper rear of the booth than at the front of the booth. U.S. Pat. No. 2,257,516 discloses an upper rear portion C (FIGS. 1 and 3) is substantially smaller in width than the width of the rear of the booth.

Water in the booth 10 is continually recirculated. Water is withdrawn from the lower reservoir 75 by a pump means 120 (FIG. 3), and pumped to the inlet manifold 62 for the upper reservoir means 60 and to the spray manifold 88. While a filter means (not shown) may be provided to protect paint particles from clogging the pump means 120, withdrawal of the water generally at the bottom of the lower reservoir 75 helps to keep the pump means 120 free of the paint particles which tend to float on the surface of the lower reservoir 28.

As the booth 10 is intended to retain substantially all stray paint, the booth quickly accumulates sizeable amounts of paint material. The booth 10 is constructed so as to facilitate cleaning and maintenance.

While wet surfaces are inherently protected from paint accumulations, other surfaces may need to be protected and/or periodically cleaned. Shields may be used to protect critical surfaces from paint. A shield 122 depends from the roof 124 of the first section to keep paint from the upper reservoir means 60. The bulk of paint particles washed from the air accumulate in the lower reservoir 75 and must be periodically removed. To facilitate removal of crud from the lower reservoir as well as to permit cleaning of the panels 37 and 38, the panels are joined together in a unit which may be lifted from the booth 10. At the bottom, the panels 37 and 38 rest in the U-shaped channel 83 which extends generally across the width of the booth 10. At the top the panels 37 and 38 are hooked to the second dam means by upper hook ends 128 which inturned flanges hooks over the upper edge of the front wall 74 of the second dam means.

While the paint accumulates primarily in the lower reservoir, paint also accumulates elsewhere in the booth. To provide access for cleaning and/or maintenance, the rear wall 81 of the booth 10 is constructed of a plurality of panel 139, 140, and 141 which extend outwardly in planes perpendicular to their respective panel sections. Fastening means such as bolts 142 connect the flanges of adjacent panel sections. Access to the booth 10 may be obtained by unbolting and removing panel section.

While the invention has been described in terms of the preferred embodiment, modification obvious to one skilled in the art without departing from the teachings of the invention which are limited only by the following claims.

The panels 37 and 38 may have their water carrying surfaces formed of a material which assists in forming and maintaining a continuous and thick water film. To this end the panels 37 and 38 may be coated with a particulate layer such as a sand filled paint which provided increased surface area and a rougher surface for the water than does a smooth flat surface. While such a surface aids in the water film carrying capabilities for the panels, it has been found to be somewhat expensive in that the panels had to be manual painted. The usual paints for spraying booths are enamel paints which provide good rust protection but which appear to be hydrophobic in that water beads up on the paint thereby lessening the water film and its continuity on the surfaces of the panels 37 and 38. On the other hand, it has been found that the use of flat paints, which appear to be hydrophyllic in that the water does not bead thereon and surface "wets" more easily, provides a more continuous and thicker water film on the surfaces of the panels 37 and 38. Thus, the present invention may use various and different materials on the surfaces of the panels to aid in providing a thick and continuous film of water on the panels.

What is claimed is:

1. A method of flowing air through a spray booth having an open front face and first and second water washes and a reservoir of water below the water washes to trap particulates therein with an efficiency of at least ninety-eight percent, one of said water washes having offset vertically extending baffles and having an air deflecting means behind the baffles to provide an increasing cross sectional area in the downward direction to direct and control air flow in the downward direction at a location behind the baffles, said method comprising the steps of:

flowing the air in a substantial horizontal direction and with a volume of at least 60 cfm across the substantially open front face of the booth and flowing air in a substantially horizontal direction across the workpiece and at a substantially uniform flow rate past the article and across the work area at which the spraying occurs;

flowing water down the generally vertical surfaces of the baffles and impinging some of the air flowing horizontally against the water flowing down the baffles to trap particulates from the air;

flowing the air laterally through slots between adjacent water wash baffles at a substantial uniform rate flow between the upper ends of the baffles adjacent the top of the booth and lower ends of the baffles adjacent the water reservior;

directing the air flow adjacent the top of the booth downwardly through a space between the baffles and the air deflecting means, the space having an increasing cross sectional area in the downward direction so that air flowing downwardly from the location of the upper ends of the baffles at the top of the booth is free to flow downwardly without being substantially impeded by air flow through the lower ends of the baffles below the workarea and above the water reservoir;

directing the air flow downwardly and then laterally across the water in the reservior to wet and trap more particulates, redirecting the air flow upwardly from the reservoir to the second water wash means;

spraying water into the upwardly flowing air and entrapping upwardly, moving airborne particulates, intersecting the upwardly flowing air to remove moisture being carried by air;

and the discharging of the cleaned air flow from the booth.

2. A method in accordance with claim 1 including the step of flowing water downwardly from a panel between the first and second water washes to form a third water wash through which the air flows.

3. A method in accordance with claim 1 including the step of removing moisture from the air by impinging airborne particles against spaced baffles which deflect the air from a straight line path of travel.

4. A spray booth for providing a uniform horizontal air flow of at least 60 cfm across a workpiece at a work area and for entrapping particulates with water before discharging cleaned air and having an efficiency of at least ninety-eight percent, said booth comprising:

an imperforate top wall in the work area of the booth;

walls defining an open front face for the booth forwardly of the work area, means for generating an air flow across the open face and adjacent work area at, at least, 60 cfm in a substantially horizontal direction across the workpiece and with a substantially uniform velocity across the workpiece;

a first water wash means having staggered baffles extending down from adjacent the top booth wall and defining slots therebetween through which air flows and is redirected laterally in its rearward travel from the work area;

means for flowing water downwardly in sheets on the surfaces of the baffles from the top of the booth to entrap airborne particulates contacting the water;

deflector means behind the said baffles extending downwardly from adjacent the top of the booth to substantially below the workpiece and defining with the baffles a space having an increasing volume in the downward direction so that air traveling downward from the top of the booth at the upper ends of the baffles does not impede air flowing across the lower ends of the baffles adjacent the reservoir thereby maintaining the horizontal air flow and the uniformity of air flow across the workpiece and area through said first water wash means;

reservior means below the baffles for collecting the water flowing therefrom and for entrapping airborne particulates coming in contact with the water in the reservior means;

the lower ends of the baffle extending to adjacent the reservior means;

means defining an upwardly extending passageway to conduct the air flow received at the lower end thereof;

a second water wash means including means for generating a water spray in impinge airborne particles remaining in the air flow;

baffle means to intersect the air and to deflect the same to remove moisture from the air;

and discharge means for the discharging the air from which the moisture and particulates have been removed.

5. A booth in accordance with claim 4 in which said deflector means includes a panel extending downwardly at an incline and having water flowing thereacross with the water dropping from the lower end of the panel to provide a third water wash for the air flow.

6. A booth in accordance with claim 4 in which said first water wash means comprises a plurality of panels of channel shaped configuration each having vertical flanges projecting in a rearward direction with the air flowing slots defined by the forward faces of the rear panels and the rearwardly projecting flanges of the front panels.

7. A booth in accordance with claim 4 in which said second wash means comprises nozzles offset from a vertical, and a splash plate below said nozzles to receive water sprays from the nozzles to form a water sheet.

* * * * *